United States Patent [19]
Stern

[11] 3,812,973
[45] May 28, 1974

[54] COMPOSITION OF MATTER FOR CONTROLLING OIL POLLUTION AND PREFERABLY OIL DISCHARGE IN WATER

[75] Inventor: Leif Einar Stern, Malmo, Sweden

[73] Assignee: Kritbruksbolaget I Malmo AB, Malmo, Sweden

[22] Filed: Mar. 22, 1972

[21] Appl. No.: 236,964

[30] Foreign Application Priority Data
Apr. 6, 1971   Sweden.............................. 4441/71

[52] U.S. Cl............ 210/502, 210/505, 210/DIG. 21
[51] Int. Cl........................................... E02b 15/04
[58] Field of Search ....... 210/DIG. 21, 40, 502, 505

[56] References Cited
UNITED STATES PATENTS

| | | | |
|---|---|---|---|
| 3,536,616 | 10/1970 | Kondoh | 210/DIG. 21 |
| 3,537,587 | 11/1970 | Kain | 210/DIG. 21 |
| 3,607,741 | 9/1971 | Sohnius | 210/DIG. 21 |

*Primary Examiner*—John Adee

[57] ABSTRACT

A fibrous composition of matter for controlling oil pollution and preferably oil discharges in water comprises fibers which consist of a mixture of paraffin and polyethylene in a preferred ratio of from about 50:50 to about 60:40 and which have been obtained from a molten mixture of paraffin and polyethylene.

4 Claims, No Drawings

COMPOSITION OF MATTER FOR CONTROLLING OIL POLLUTION AND PREFERABLY OIL DISCHARGE IN WATER

This invention relates to a composition of matter for controlling oil pollution and preferably oil discharges on water surfaces.

Various types of oil controlling agents are previously known. Oil discharged on water surfaces can thus be prevented from spreading by the use of absorption agents, by emulsification or by mechanical delimiting means, so-called oil barriers or booms.

There are two main types of absorption agents, viz. on the one hand highly fluid absorption agents (floating agents), which together with oil form lumps which float on the water surface and are of such a consistency that the collected oil will become relatively slightly smearing, and on the other hand heavy powders (sinking agents) which upon absorption of the oil cause it to sink to the bottom.

Among the floating agents there are both natural and synthetic materials such as peat, bark, saw-dust, torn polyurethane foam, etc. The natural materials have the advantage of being relatively inexpensive, but they are often less effective than the synthetic materials, int.al. because they take up water more or less rapidly and sink to the bottom together with the absorbed oil. Moreover, absorbed oil may be released, which of course is not desirable.

Sinking agents such as cinders and clay slate are only usable when their effects on the sea fauna can be disregarded. Since the sinking agents moreover do not always keep the oil permanently bound but may release the oil so that it floats to the surface again, the use of such agents should generally be avoided.

It is also previously known to provide an absorption agent consisting of a mass of polymer material with a surface coating of paraffin. The resultant paraffin content is relatively low.

It is further previously known to prepare absorption agents in fibrous form.

Emulsification of the oil implies that the oil is divided into fine droplets suspended in the water. Emulsification can take place by mechanical working, for instance by means of a water jet, which yields an emulsion that is relatively rapidly decomposed. It is more customary to use emulsifying agents (surfactants) which provide a substantially stable emulsion. The disadvantage of emulsification is that the oil is obtained in a form difficult to take up or remove from the water.

This invention relates to a new floating-type oil pollution controlling agent which per unit of weight takes up a large amount of oil and which is characterized in that it consists of fibres of a mixture of polyethylene and paraffin.

The invention provides an inexpensive and effective oil pollution controlling agent which can easily be spread and collected. The agent is also suited for taking up firing oil No. 3 or thicker oil. As already mentioned, it is characteristic of the fibres according to the invention that they consist of a mixture of polyethylene and paraffin. It should be observed that the paraffin is not a surface coating on the polyethylene but forms a mixture with the polyethylene in connection with the actual manufacture of the fibres. From the polyethylene-paraffin mixture there are obtained fibres which are very effective in taking up oil and also inexpensive to manufacture because of the admixture of paraffin. The mixing ratio of polyethylene to paraffin can vary; a high content of paraffin gives a relatively brittle fibre while a high content of polyethylene yields a stronger but simultaneously more expensive fibre. The quantity of oil taken up per quantity of fibre is not appreciably affected by the ratio of paraffin to polyethylene in the fibre. It has proved that a suitable ratio of paraffin to polyethylene is from about 50:50 to about 60:40. The fibres according to the present invention must not be confused with conventional fibres of solely polyethylene.

At the manufacture the fibres are given a suitable cross sectional diameter. The smallest possible cross sectional diameter is desirable in view of the consumption of polyethylene per quantity of oil absorbed, i.e. cost. A suitable cross sectional diameter is 0.02 mm or less.

At the manufacture the fibres are obtained in the form of monofilaments which are then preferably comminuted into staple fibres.

An example of a preferred embodiment of the invention is given hereinbelow for elucidatory but not restrictive purposes.

EXAMPLE

In a vessel 60 g of paraffin were batched and the vessel was heated until the paraffin had molten. 40 g of polyethylene granules were then added and the batch was heated under agitation to about 180°C. Heating and agitation were continued until polyethylene had been dissolved in the paraffin and a viscous melt had been obtained. This melt was then allowed to flow through apertures having a diameter of 5 mm so as to form strands. These strands were exposed to blowing by means of a vigorous stream of air and from the strands there were formed thin fibres in the form of monofilaments.

The monofilaments prepared formed a loose fibre mass which was then tested in view of its capability of absorbing oil. This testing was carried out by first pouring water into an open vessel and then firing oil No. 3 which came to float on the surface of the water. The mass of fibres was spread on the oil polluted water surface and it was found that the mass of fibres took up oil in a quantity 20 times its own weight, i.e. 1 g of fibre absorbed 20 g of oil.

The fibres according to the invention when taking up oil impurities preferably are in the form of a loose mass of fibres which is spread by hand or by means of a fan at the place to be treated. Other procedures comprise first suspending the fibres in water and then spraying the suspension onto the oil, or preparing from the fibres self-supporting, not too thick mats which can be rolled together for transportation and which in use are only rolled out and placed at the desired spot. It is also possible to enclose the fibres in a netting or other type of container of open structure that permits a good contact between the fibres and the oil so that an oil barrier is obtained. By this arrangement the collection of oil-soaked fibre material will be very simple.

When fibres according to the invention are spread onto oil a complete contact is established between the fibres and the oil, that is, the fibres penetrate into the oil so that a contact is obtained also in the depth direction and not, as is the case in particulate oil pollution controlling material, only within a superficial portion, whereby further contact between the particles and the oil is prevented.

A further unique advantage obtained with the composition of matter according to the present invention is that the collected fibre-laden oil need not be discarded or considered as valueless but can be used as ordinary oil, e.g. as fuel in oil power stations without particular measures being taken to separate the fibre material from the oil. As a matter of fact, it has been found that upon heating of the fibre-laden oil to approximately 100°C the fibres dissolve in the oil so that a homogeneous product is obtained. This contributes to making the composition of matter according to the invention economical in use. Conventional agents for oil pollution control do not provide the possibility of utilizing the collected oil but require extensive measures to be taken for making the oil useful.

Since the fibres dissolve in the oil when heated, it is possible to attain a further advantage, with the fibrous composition of matter enclosed in a netting, by making said netting from a heavier dimension of fibres according to the invention. The collection of oil discharged in water by means of such a netting and composition of matter enclosed therein will yield a product that is very easily handled as it need only be heated to become substantially identical with and useful in the same way as the original oil.

While the composition of matter according to the invention has been described in the foregoing mainly in connection with the removal of oil spillage from water surfaces, those skilled in the art will realize that the composition is useful for removing oil also from other surfaces, bases and substrates.

What I claim and desire to secure by Letters Patent is:

1. A fibrous composition of matter for controlling oil pollution and preferably oil discharges on water surfaces, wherein the fibres consist of a mixture of polyethylene and paraffin, in the ratio of between 50 – 40 parts of polyethylene to 50 – 60 parts of paraffin.

2. A composition as claimed in claim 1, wherein the fibres form a self-supporting mat.

3. A composition as claimed in claim 1, wherein the fibres form a loose mass of fibres.

4. A composition as claimed in claim 1 wherein the ratio of paraffin to polyethylene is 60:40.

* * * * *